United States Patent Office 3,313,802
Patented Apr. 11, 1967

3,313,802
PROCESS OF LIQUEFYING GELLED CELLULOSE ESTER ACID DOPES
Wayne G. Case, Kingsport, Tenn., assignor to Eastman Kodak Company, Rochester, N.Y., a corporation of New Jersey
No Drawing. Filed Apr. 15, 1964, Ser. No. 360,091
4 Claims. (Cl. 260—230)

This invention relates to a method of liquefying gelled cellulose ester acid dopes comprising their treatment with low pressure steam.

In the making of cellulose esters certain types of esters require a considerable degree of hydrolysis. It is very easy in such processes to unduly extend the degree of hydrolysis beyond solubility in the acetic acid-water solvent in which hydrolysis is ordinarily carried out with the result that the liquid may set or gel. This may occur either in a vessel in which the cellulose ester material is caused to stand or in pipe lines in which it may be present. This sometimes becomes a problem in the manufacture of cellulose esters particularly cellulose acetate in that infrequently used acid dope lines may become plugged with solid ester or stagnant pockets in regularly used pipe lines may become plugged in time.

Normal procedure for removing gelled acid dope from a container or from a conduit in which it might be found consists of physical removal. This is obviously undesirable as compared with conveying the material in liquid form.

One object of my invention is to provide a method of converting gelled cellulose ester dope to liquid form whereby it may be readily removed from the apparatus in which it is contained.

Another object of my invention is to provide a method for liquefying gelled cellulose ester dope employing steam. Other objects of my invention will appear herein.

In the making of lower fatty acid esters of cellulose, it is common to react upon cellulose with a lower fatty acid anhydride and a catalyst usually using a lower fatty acid is the solvent. After the cellulose has been esterified, it is often hydrolyzed to obtain desired solubilities or other properties. This procedure ordinarily involves the addition of water or aqueous acid to the cellulose ester mass to supply sufficient water for hydrolysis conditions.

My invention involves subjecting cellulose ester dope which has gel particles or is completely gelled to treatment with steam for a time sufficient to liquefy the cellulose ester mass whereupon it is readily removed from the apparatus in which it is contained. My invention is particularly applicable to cellulose acetate dopes the cellulose acetate of which has been hydrolyzed down to an acetyl content of approximately 25–30%. However, in other solvents gelling may evidence itself at other acyl contents and my invention will also be useful in those cases.

The following non-limiting examples illustrate my invention:

EXAMPLE 1

A cylindrical tank having a 1½ ft. diameter and 2 ft. depth was filled within 2 inches of the top with a cellulose acetate acid dope composed of a solution of cellulose acetate in acetic acid and water together with some sulfuric acid catalyst and hydrolysis was carried out in the tank at 120° F. After hydrolyzing for a time it was observed that gelling had taken place. The tank was covered with a lid that had a 1½ inch vent hole and ⅜ inch hole through which a ¼ inch stainless steel tube was inserted into the gel at the top of the tank. Steam at approximately 10 p.s.i. was blown into the gel dope through the ¼ inch tube for a 15 minute period. The lid was removed and 6 gallons condensate and dissolved dope were removed. The lid was replaced and steam was blown into the tank for an additional 15 minute period. The lid was again removed and the remaining gelled dope had been dissolved. The liquid portion of the mass comprised 70.1% acetic acid and the acetyl content of the dissolved cellulose acetate therein was 23.1%.

EXAMPLE 2

A one-half gallon jar was filled with cellulose acetate acid dope and the dope was hydrolyzed at 120° F. resulting in some gel formation. A quart of this sample was placed in a 3 gallon bucket and steam at approximately 10 p.s.i. was blown into the mass through a ⅛ inch copper tube. After 10 minutes the gelled sample had dissolved accompanied by condensation of a quart of steam during this interval.

EXAMPLE 3

A pipe which had been used to transport cellulose acetate hydrolysis dope contained some gelled dope therein. This pipe line was treated by passing steam therethrough for a 15 minute interval. The gelled dope which had been present in the pipe became liquefied and was readily removable upon the passage of further hydrolyzed dope through the pipe.

My invention is useful in liquefying gelled acid hydrolysis dopes of any of the lower fatty acid esters of cellulose such as propionates, butyrates as well as acetates or the mixed lower fatty acid cellulose esters such as acetate propionates or acetate butyrates. Although 10 p.s.i. steam is convenient for use, steam of higher or lower pressures than 10 such as 5, 8, 12, 3, 15, 20 or the like p.s.i. may be found convenient for use in accordance with my invention.

The invention has been described in considerable detail with particular reference to certain preferred embodiments thereof, but it will be understood that variations and modifications can be effected within the spirit and scope of the invention as described hereinabove and as defined in the appended claims.

I claim:
1. A method of liquefying cellulose ester hydrolysis dope in an at least partially gelled condition which comprises subjecting said dope to treatment with low pressure steam, until a readily flowable condition is assumed.
2. A method of liquefying a cellulose ester hydrolysis dope which has become gelled in the container in which the hydrolysis is conducted which comprises passing low pressure steam through the dope in the container, until said dope assumes a readily flowable condition.
3. A method of liquefying a cellulose ester hydrolysis dope which has become gelled in a pipe which comprises passing low pressure steam into the pipe containing the dope until it assumes a readily flowable condition.
4. A method of liquefying a cellulose acetate hydrolysis dope, in at least partially gelled condition which comprises applying low pressure steam to said dope until it assumes a readily flowable condition.

References Cited by the Examiner
UNITED STATES PATENTS
2,097,954   12/1937   Malm _____ 260—230 XR OTHER REFERENCES
Ott et al.: "Cellulose and Cellulose Derivatives," Interscience Inc., N.Y. (1954), pp. 687–89.

LEON J. BERCOVITZ, Primary Examiner.

R. W. MULCAHY, Assistant Examiner.